(12) United States Patent
Moody (10) Patent No.: US 7,804,212 B2
(45) Date of Patent: Sep. 28, 2010

(54) COOLING TOWER SEALANT CONTAINMENT GASKET

(75) Inventor: Jim Moody, Olive Branch, MS (US)

(73) Assignee: Emerson Electric Co., St. Louis, MO (US)

( * ) Notice: Subject to any disclaimer, the term of this patent is extended or adjusted under 35 U.S.C. 154(b) by 302 days.

(21) Appl. No.: 12/146,289

(22) Filed: Jun. 25, 2008

(65) Prior Publication Data
US 2009/0322169 A1    Dec. 31, 2009

(51) Int. Cl.
*H02K 5/12* (2006.01)
(52) U.S. Cl. .......................................... 310/88; 310/89
(58) Field of Classification Search .................. 310/88, 310/89, 71
See application file for complete search history.

(56) References Cited

U.S. PATENT DOCUMENTS

| 5,095,612 A | * | 3/1992 | McAvena | 29/596 |
| 5,311,090 A | * | 5/1994 | Ferlatte | 310/88 |
| 6,372,993 B1 | * | 4/2002 | Eckels et al. | 174/152 GM |
| 6,608,414 B1 | | 8/2003 | Conley | |
| 7,197,892 B2 | * | 4/2007 | Ioi et al. | 62/508 |

* cited by examiner

*Primary Examiner*—Nguyen N Hanh
(74) *Attorney, Agent, or Firm*—Hovey Williams LLP (57) ABSTRACT

A sealant containment gasket is provided for use on an electric motor to be used in a moist environment. The inventive gasket includes a first upright wall that covers a power-supply opening in the motor with a wiring passageway and further includes a second upright wall, at least a portion of which is spaced away from the first upright wall. The walls of the gasket cooperate to form a pocket to receive wiring extending through the opening in the motor. The pocket also defines a cavity between the walls with a filling hole disposed along a top margin thereof. Liquid sealant is inserted into the cavity through the filling hole when the motor is disposed right-side-up and on its feet in the assembly position. The liquid sealant is contained within the pocket and forms a barrier around the wiring passageway to prevent moisture from entering the motor.

32 Claims, 7 Drawing Sheets

COOLING TOWER SEALANT CONTAINMENT GASKET

BACKGROUND OF THE INVENTION

1. Field of the Invention

The present invention relates generally to electric motors, particularly those motors used in moist or wet environments, such as a cooling tower. More specifically, the present invention concerns a sealant containment gasket that is filled with liquid sealant through a filling hole disposed at the top of the gasket.

2. Discussion of the Prior Art

Those of ordinary skill in the art will appreciate that electric motors, particularly those motors for use in industrial applications with moist or wet environments, such as cooling towers, are large, heavy, and require careful assembly. It is known that there is typically an opening in the motor shell through which passes power lead wiring from inside the motor chamber to connect to wiring from an outside power source. Conventionally, a gasket has covered this opening when it needs to keep water or moisture out and the gasket has typically been open, like a bowl, and configured to hold an amount of liquid sealant that solidifies to provide a moisture barrier between the wiring and the wiring passageway in the gasket. While this construction has been satisfactory in some respects, the solidifying of the liquid sealant in the bowl-forming gasket requires a considerable amount of time during the motor assembly process. In particular, the opening on the horizontal side of the motor must be covered with a gasket, wires must be run through the gasket from inside the motor chamber, and then the entire motor must be pivoted ninety degrees onto its side to have the gasket face upward so that the bowl formed therein can be filled with sealant.

The motor assembly process is then put on hold while the liquid sealant adequately dries and solidifies before the motor can be pivoted the ninety degrees back to its proper right-side-up assembly position so that further assembly of the components can be completed. It is known that it is in the nature of such maneuvering of dangerous and heavy equipment that safety and performance issues arise, including the introduction of additional pinch points during motor movement, the necessity of specialized equipment to move large motors, and the time lost while waiting for sealant to set before further assembly is undertaken. Such specialized equipment is often both expensive and heavy, and can require additional time to design for the particular use needed. In one application of using conventional bowl gaskets on large cooling tower motors, some of which can weigh upwards of six hundred pounds, specialized steel tables were designed, purchased, and installed with forklifts to facilitate the pivoting of the electric motors.

SUMMARY

The present invention provides an electric motor and a sealant containment gasket for sealing around power lead wires with a liquid sealant while the motor is preferably in the right-side-up orientation. The inventive gasket forms a pocket around the power lead wires extending out of the motor case and defines a cavity into which liquid sealant can be inserted through a filling hole in the top of the pocket. The liquid sealant is contained within the pocket of the gasket and forms a barrier around the wiring to prevent moisture from entering the motor through the power-supply opening. Inserting liquid sealant into the gasket from the top (while the motor is orientated right-side-up for assembly processes) saves considerable time and increases the safety of assembly, as the heavy motor does not need to be pivoted to a different orientation.

According to one aspect of the present invention, an electric motor is provided that includes a rotor rotatable about an axis, a stator spaced radially from the rotor, and a case presenting an internal motor chamber in which the stator and rotor are housed. The case includes a power-supply opening defined in the case to provide wiring access to the motor chamber. The power-supply opening is located along a side of the case and faces at least a substantially horizontal direction. The motor also includes motor wiring extending through the power-supply opening and into the motor chamber and a gasket fastened to the case in a covering relationship with the power-supply opening. The gasket includes a first upright wall that spans the power-supply opening and includes a wiring passageway snugly receiving the motor wiring therethrough. The gasket further includes a second upright wall at least partially spaced horizontally from the first upright wall to cooperatively define a pocket that receives the motor wiring extending through the wiring passageway. The pocket defines a cavity configured to hold a liquid sealant. The pocket presents a top margin and a filling hole located along the top margin, with the hole being in communication with the cavity and thereby permitting liquid sealant to be introduced therein.

Another aspect of the present invention concerns a gasket for covering a horizontally facing power-supply opening located on the side of an electric motor case, wherein wiring from the motor chamber extends through the power-supply opening. The gasket includes a first upright wall that is configured to span the power-supply opening and includes a wiring passageway configured to snugly receive the motor wiring therethrough. The gasket further includes a second upright wall at least partially spaced horizontally from the first upright wall to cooperatively define a pocket for receiving the motor wiring. The pocket defines a cavity configured to hold a liquid sealant. The pocket presents a top margin and a filling hole located along the top margin, with the hole being in communication with the cavity and thereby permitting liquid sealant to be introduced therein.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

The present invention provides a gasket for covering a power-supply opening located on the side of an electric motor case, wherein wiring from the motor chamber extends through the power-supply opening. The gasket broadly includes first and second upright walls, with the second upright wall being at least partially spaced from the first upright wall to cooperatively define a pocket. The pocket defines a cavity that is configured to hold a liquid sealant that forms a barrier around the power-supply opening to prevent moisture from entering the motor chamber.

Figure 1:
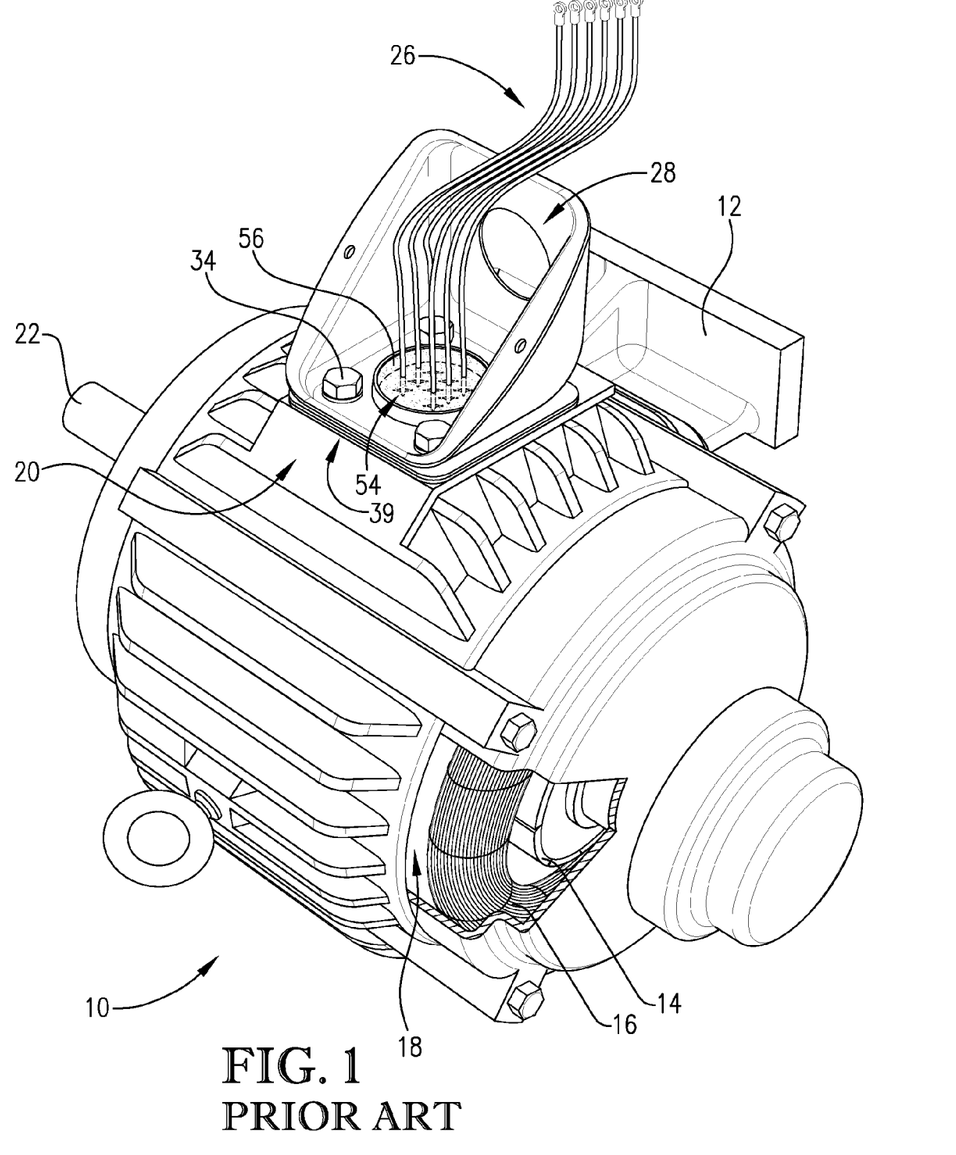
FIG. 1 is a perspective view of a prior art electric motor, shown with a portion of the motor case broken away to reveal the components inside and depicting a conventional gasket that forms a bowl for liquid sealant when the motor is on its side to dispose the gasket on top.
Figure 2:
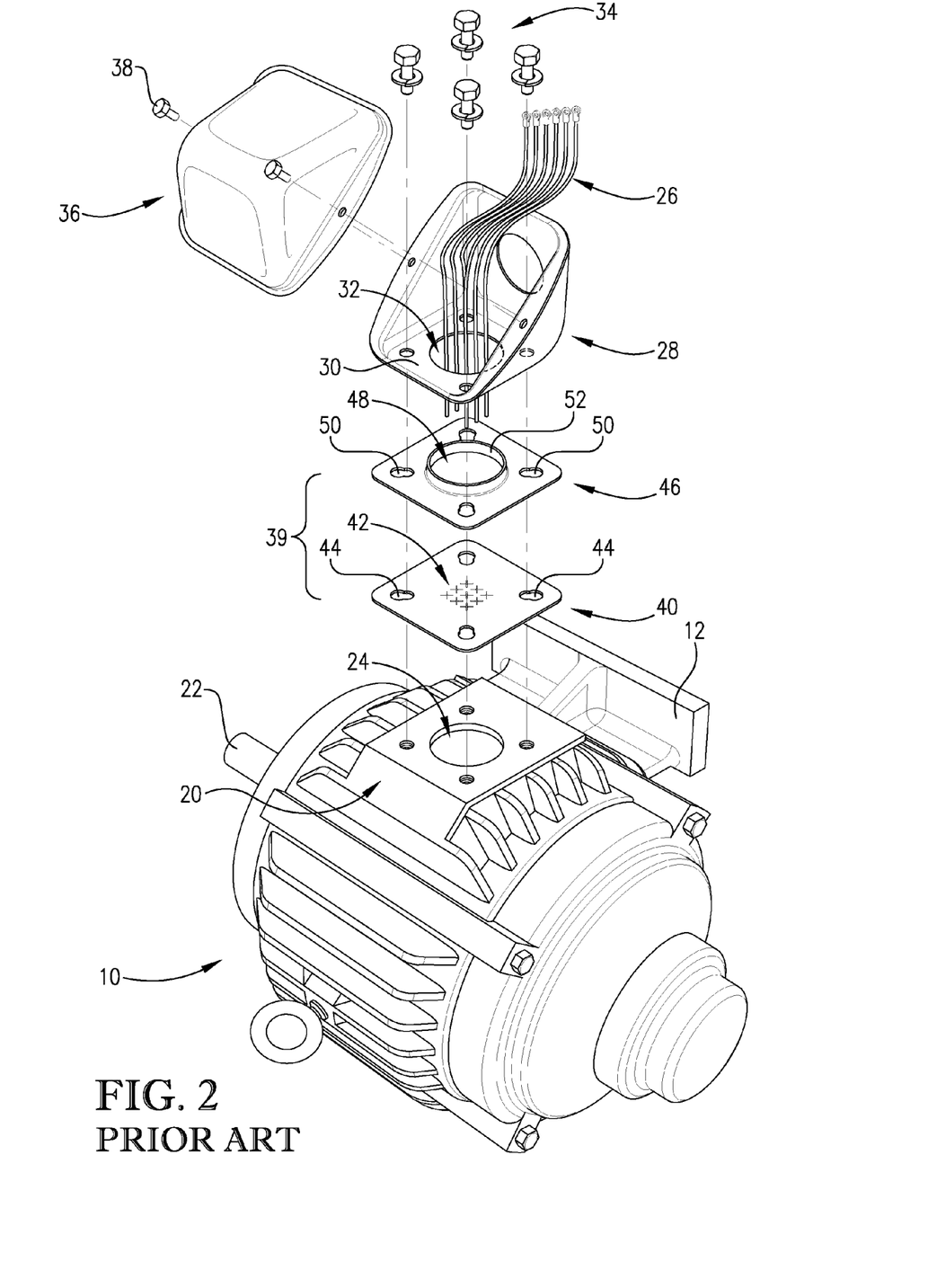
FIG. 2 is an exploded perspective view of the prior art electric motor shown in FIG. 1, particularly illustrating the separate components thereof, including an opening in the motor case, the flat gasket panel, the bowl-forming gasket panel, and a junction box with associated fasteners and wiring.

With initial reference to FIGS. 1 and 2, a prior art electric motor 10 is depicted with outwardly extending supporting feet 12. It is noted that the supporting feet 12 extend in a downward direction when the motor 10 is in the right-side-up orientation, but as depicted in FIGS. 1 and 2, the supporting feet 12 extend in a horizontal direction, as the motor 10 is illustrated as having been pivoted ninety degrees to be disposed on its side, as will be readily appreciated by one of ordinary skill in the art. The motor 10 broadly includes a rotor 14 and a stator 16, with the rotor 14 and the stator 16 both contained within an internal motor chamber 18 defined inside a motor case 20. A shaft 22 projects outwardly from the motor 10 in an axial direction.

The motor case 20 includes a case power-supply opening 24 defined in a side of the motor case 20 to provide wiring access to the motor chamber 18. Motor power lead wiring 26 extends from inside the motor chamber 18, through the power-supply opening 24, and outside the motor case 20. As depicted in FIG. 1, a conduit box 28 is attached to the side of the motor case 20 and the power lead wiring 26 extending therefrom is configured to be attached to wiring from a power source (not shown) within the conduit box 28. The conduit box 28 includes a mounting back wall 30 with a conduit box power-supply opening 32 defined therein to provide wiring access into the conduit box 28. The conduit box 28 is fastened to the side of the motor case 20 with bolts 34, and (as depicted in FIG. 2) a conduit box cover 36 is provided to cover the conduit box 28 and attach thereto with bolts 38, as is generally known in the art.

With continued reference to FIGS. 1 and 2, the motor 10 is provided with a conventional gasket 39, which includes first and second gasket panels 40 and 46. the first gasket panel 40 is generally flat and includes a first gasket wiring passageway 42 and a plurality of bolt holes 44. Additionally, a second gasket panel 46 is provided that includes a second gasket wiring passageway 48 and a plurality of bolt holes 50. The second gasket panel 46 also includes a projecting wall 52 disposed around the periphery of the second gasket wiring passageway 48. The first and second gasket panels 40 and 46 are positioned on the side of the motor case 20 between the motor case 20 and the conduit box 28, with the first gasket panel 40 disposed directly against the side of the motor case 20, the second gasket panel 46 surmounting the first gasket panel 40, and the conduit box 28 surmounting the second gasket panel 46. In such configuration (as shown in FIG. 1), the first gasket panel 40 and the projecting wall 52 of the second gasket panel 46 cooperate to form a bowl 54.

The bowl 54 can hold a sealant 56 that is used to seal around the wiring passageway 42 in the first gasket panel 40, as is generally known in the art. As will be readily appreciated by one of ordinary skill in the art, it is often desirable to keep the sealant 56 confined within the bowl 54 and away from the conduit box 28. As depicted particularly in FIG. 1, in order to adequately contain the sealant 56 within the bowl 54 formed by the gasket 39, the motor 10 of the prior art must be pivoted onto its side, such that the bowl 54 faces upward.

While the upward-facing bowl 54 does confine the sealant 56 therein when the motor 10 is disposed on its side, it is noted that pivoting the motor 10 onto its side from a right-side-up disposition so that the bowl 54 can be filled with sealant 56 is a considerable task. The motor 10 is often much too heavy to manually lift without mechanical assistance. Accordingly, it is known practice in the art to clamp the motor 10 to a specialized steel work table (not shown) by the supporting feet 12. Such a specialized work table can then be shifted to pivot the motor 10 into the disposition shown in FIGS. 1 and 2. Such specialized tables are very expensive, and the movement of the heavy motor 10 introduces numerous pinch points and other risks to the motor assembly process. Additionally, as many assembly process steps require that the motor be in the right-side-up orientation, considerable time is lost waiting for the sealant 56 to set up so that the motor 10 can be pivoted back to this orientation.

Figure 3:
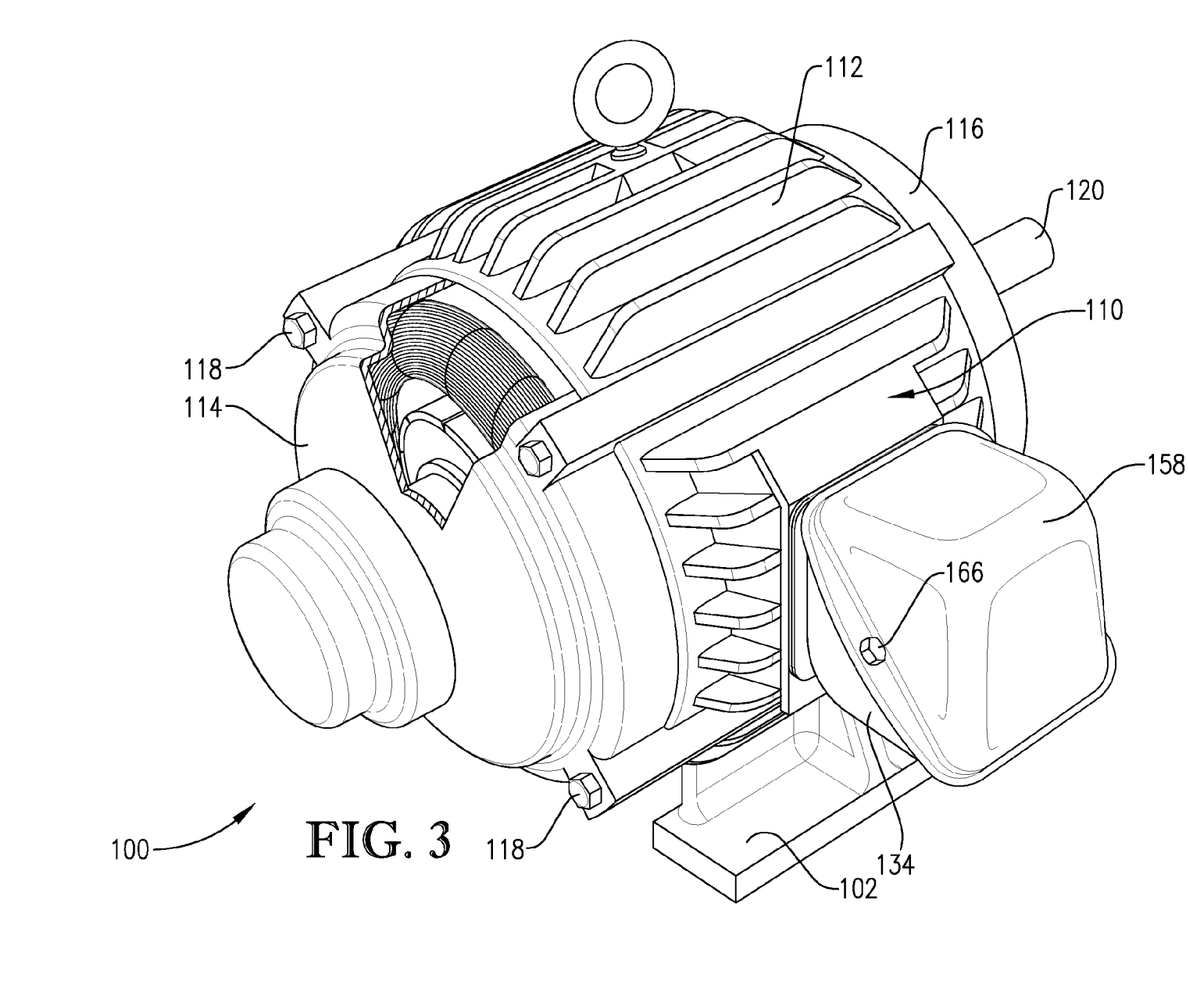
FIG. 3 is a perspective view of an electric motor constructed in accordance with the principles of a preferred embodiment of the present invention, depicting the motor in its right-side-up orientation and shown with a portion of the motor case broken away to reveal the components inside and depicting a covered junction box.
Figure 4:
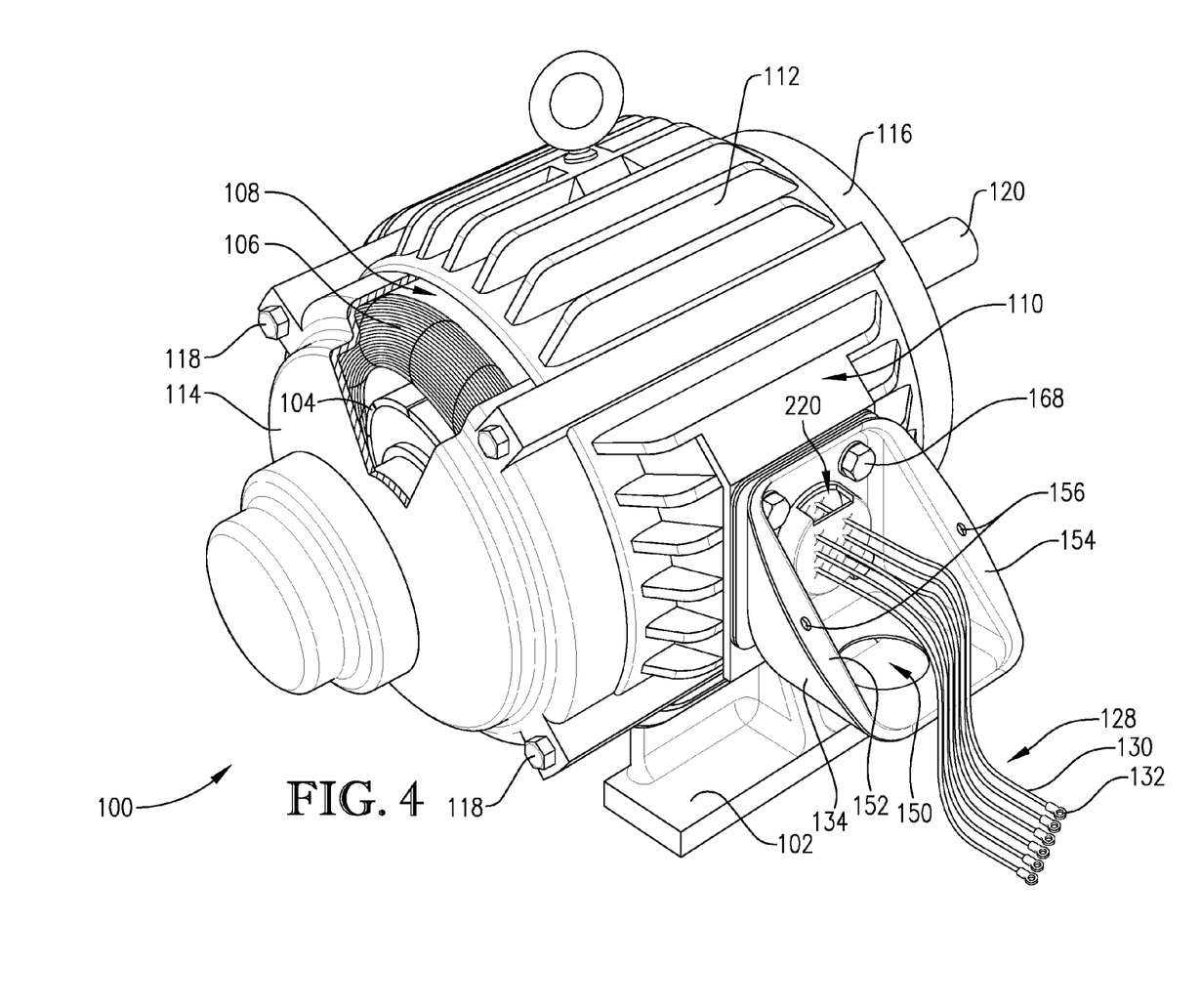
FIG. 4 is a perspective view of the electric motor shown in FIG. 3, shown with the junction box cover removed to reveal the gasket inside.

Turning now to FIGS. 3 and 4, an electric motor 100 constructed in accordance with a preferred embodiment of the present invention is depicted with downwardly extending supporting feet 102. Initially, it is noted that the motor 100 is disposed in a right-side-up orientation. The motor 100 broadly includes a rotor 104 and a stator 106, with the rotor 104 and the stator 106 both contained within an internal motor chamber 108 defined inside a motor case 110. The motor case 110 includes a generally cylindrical shell 112 with endbells 114, 116 at each axial end thereof. The endbells 114, 116 are fastened to the shell 112 with bolts 118. A rotatable shaft 120 projects outwardly from the motor 100 in an axial direction. As is known in the art, a so-called horizontal motor has an axis that projects in a generally horizontal direction, while a so-called vertical motor has an axis that projects in a generally vertical direction. It is noted that the principles of the present invention are equally applicable to both horizontal and vertical motors, as will be readily appreciated by one of ordinary skill in the art upon review of this disclosure.

Figure 7:
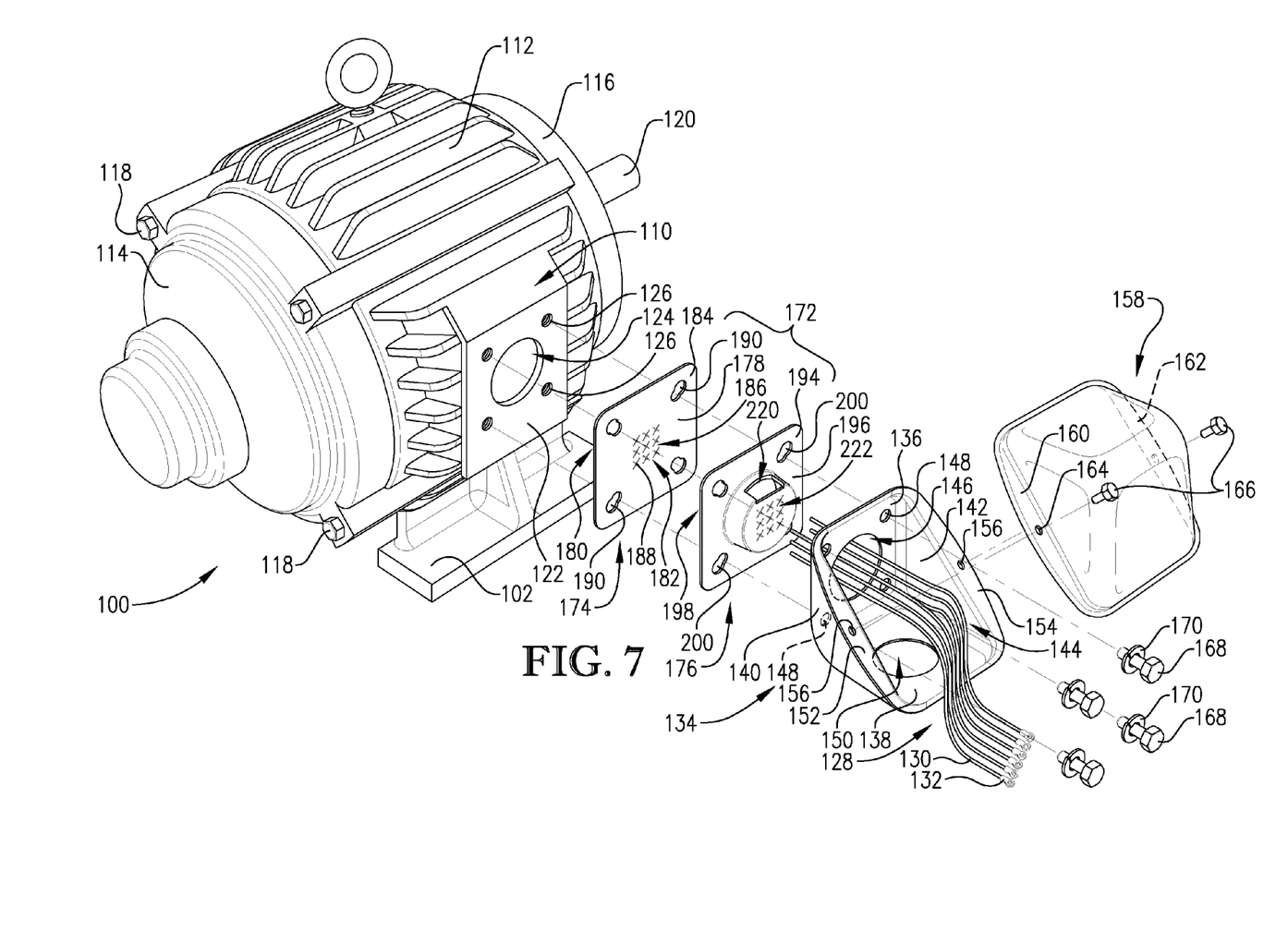
FIG. 7 is an exploded perspective view of the electric motor shown in FIG. 3, particularly illustrating the separate components thereof, including a hole in the motor case, the flat gasket panel, the pocket-forming gasket panel, and a junction box with associated fasteners and wiring.

With continued reference to FIGS. 3 and 4, and with reference to FIG. 7, a side of the motor case 110 includes a flat face 122 with a power-supply opening 124 defined therein to provide wiring access to the motor chamber 108. The flat face 122 on the side of the motor case 110 also includes a plurality of threaded bolt-receiving holes 126 defined therein and disposed around the power-supply opening 124.

Motor power lead wiring 128 extends from inside the motor chamber 108, through the power-supply opening 124, and outside the motor case 110. The lead wiring 128 comprises a plurality of individual wires 130, each with a terminal connector 132 at an end thereof. The terminal connectors 132 of the individual wires 130 are configured for connection to power-supply wires (not shown) to supply power to the electric motor 100, as will be readily appreciated by one of ordinary skill in the art upon review of this disclosure.

A conduit box 134 is attached to the flat face 122 of the side of the motor case 110 and provides a location for connecting the lead wiring 128 to power-supply wires (not shown). The conduit box 134 includes a back wall 136, a bottom wall 138, and side walls 140, 142 that define a box interior 144. A conduit box power-supply opening 146 is defined in the back wall 136 to provide wiring access to the interior 144 of the conduit box 134. In addition, a plurality of holes 148 are defined in the back wall 136 that are disposed around the power-supply opening 146, such that the holes 148 align correspondingly with the bolt-receiving holes 126 in the flat face 122 of the side of the motor case 110.

A power-source opening 150 is defined in the bottom wall 138 to provide wiring access to the interior 144 of the conduit box 134, such that power-supply wires (not shown) can be joined with the lead wiring 128 within the interior 144 of the conduit box 134. The conduit box 134 further includes flanges 152, 154 that extend along margins of the side walls 140, 142. The flanges 152, 154 each include a hole 156 defined therein and generally centrally located along each flange 152, 154. A conduit box cover 158 generally corresponds to the shape of the conduit box 134, but without the power-supply opening 146, the power-source opening 150, or the holes 148 therein. The cover 158 includes flanges 160, 162 with holes 164 defined therein and generally centrally located along each flange 160, 162. As shown in FIG. 3, bolts 166 are received in the holes 164 and 156 to secure the cover 158 to the conduit box 134, as will be readily appreciated by one of ordinary skill in the art upon review of this disclosure.

The back wall 136 of the conduit box 134 corresponds to the flat face 122 of the side of the motor case 110 such that when the holes 148 in the conduit box are aligned with the bolt-receiving holes 126 in the flat face 122 of the side of the motor case 110, the conduit box power-supply opening 146 is aligned with the power-supply opening 124 in the motor case 110. As shown particularly in FIGS. 4 and 7, bolts 168 with lock washers 170 extend through the holes 148 and are received in the holes 126 of the motor case 110 to secure the conduit box 134 to the flat face 122 of the side of the motor case 110, as will be readily appreciated by one of ordinary skill in the art upon review of this disclosure.

With reference now to FIG. 7, a gasket, broadly identified as 172, is disposed between the flat face 122 of the side of the motor case 110 and the back wall 136 of the conduit box 134 in a covering relationship with the power-supply opening 124 in the motor case 110. The gasket 172 is preferably, although not necessarily, made of a compressible and resilient material, such as rubber or the like. In the illustrated embodiment, the gasket 172 is a two-part gasket that broadly comprises a first panel 174 and a second gasket panel 176, although it is clearly within the ambit of the present invention for an alternative gasket to comprise a single element (e.g., an integrally molded unitary body).

With continued reference to FIG. 7, the first gasket panel 174 has a generally rectangular periphery and presents a substantially constant depth dimension between a front face 178 and an opposed back face 180. The first gasket panel 174 broadly includes a central wall portion 182 and an outer flange portion 184. The central wall portion 182 of the first gasket panel 174 spans the power-supply opening 124 in the motor case 110 and includes a wiring passageway 186 configured to snugly receive the power lead wiring 128 therethrough. In the depicted embodiment, the wiring passageway 186 comprises a plurality of X-shaped holes 188, with each hole 188 configured to snugly receive an individual wire 130 therethrough, although such configuration is not required. For example, it is clearly within the ambit of the present invention for an alternative wiring passageway to comprise a single opening that stretches to snugly receive one or more wires therethrough. The outer flange portion 184 includes a plurality of holes 190 defined therein that align correspondingly with the bolt-receiving holes 126 in the flat face 122 of the side of the motor case 110 to facilitate securement thereto.

Figure 5:
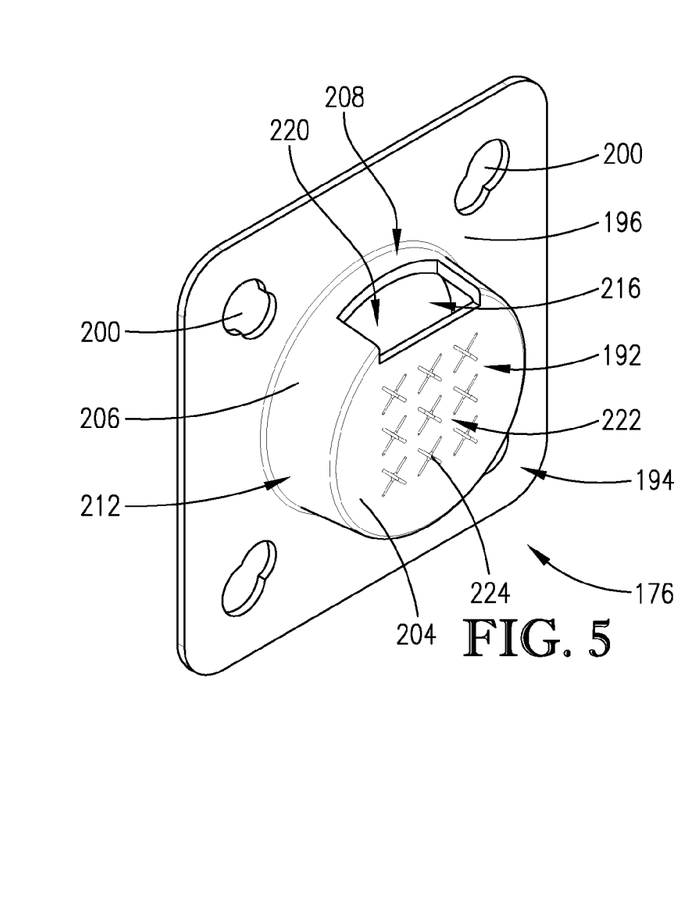
FIG. 5 is an enlarged perspective view of the pocket-forming gasket panel constructed in accordance with the principles of a preferred embodiment of the present invention, depicting in detail an end wall with X-shaped holes defined therein to form a wiring passageway and a filling hole at the top.
Figure 6:
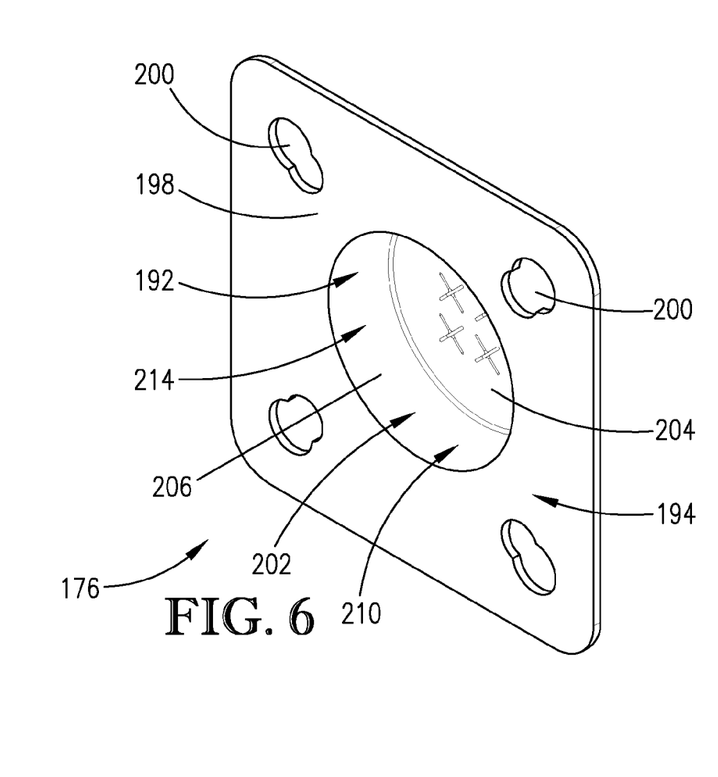
FIG. 6 is an enlarged perspective view of the pocket-forming gasket panel, similar to that of FIG. 5, but from the opposite vantage point, depicting in detail an outer flange portion and a cavity defined in the gasket.

With continued reference to FIG. 7, and with reference to the detailed views of FIGS. 5 and 6, the second gasket panel 176 broadly includes a central pocket-defining portion 192 and an outer flange portion 194. The outer flange portion 194 of the second gasket panel 176 has a generally rectangular periphery, similar to that of the first gasket panel 174, and presents a substantially constant depth dimension between a front face 196 and an opposed back face 198. The outer flange portion 194 also includes a plurality of holes 200 defined therein that align correspondingly with the holes 190 in the first gasket panel 174 and the bolt-receiving holes 126 in the flat face 122 of the side of the motor case 110 to facilitate securement thereto.

The central pocket-defining portion 192 of the second gasket panel 176 cooperates with the central wall portion 182 of the first gasket panel 174 to define a pocket 202. In the illustrated embodiment, the central pocket-defining portion 192 of the second gasket panel 176 includes a generally vertically extending end wall 204 and a generally horizontally extending interconnecting wall 206. The pocket 202 receives therein the power lead wiring 128 that is snugly received through the wiring passageway 186 of the first gasket panel 174. The pocket 202 presents a top margin 208, a bottom margin 210, and side margins 212, 214 that cooperatively define a cavity 216 that is configured to hold a liquid sealant 218. A filling hole 220 communicating with the cavity 216 is defined in the top margin 208 of the pocket 202 such that the liquid sealant 218 can be introduced therein, as will be described in more detail below.

In the illustrated embodiment, the end wall 204 includes a wiring passageway 222 configured to snugly receive the power lead wiring 128 from the pocket 202 therethrough, although it will be appreciated that such a passageway is not necessary (e.g., the power lead wiring 128 could alternatively pass through the filling hole 220). As depicted, the wiring passageway 222 comprises a plurality of X-shaped holes 224, with each hole 224 configured to snugly receive an individual wire 130 therethrough, although such configuration is not required. For example, it is clearly within the ambit of the present invention for an alternative wiring passageway to comprise a single opening in the end wall 204 that stretches to snugly receive one or more wires therethrough. Again, it is specifically noted that it is entirely within the ambit of the present invention not provide a separate wiring passageway at all, but instead to route the power lead wiring 128 from the pocket 202 out of the filling hole 220 instead of through a dedicated wiring passageway.

It is noted that in the embodiment depicted, the end wall 204 is generally circular and the corresponding interconnecting wall 206 is generally cylindrical in shape, though other configurations for the central pocket-defining portion 192 of the second gasket panel 176 may be formed without departing from the teachings of the present invention. For example, an alternative interconnecting wall could be polygonal, so long as a complementary end wall spans the connecting wall to define a pocket. Similarly, a generally spherical end wall or other curved pocket structure could be formed without a separately defined interconnecting wall, so long as at least a part of the central pocket-defining portion extends upright to cooperatively form a pocket.

Figure 8:
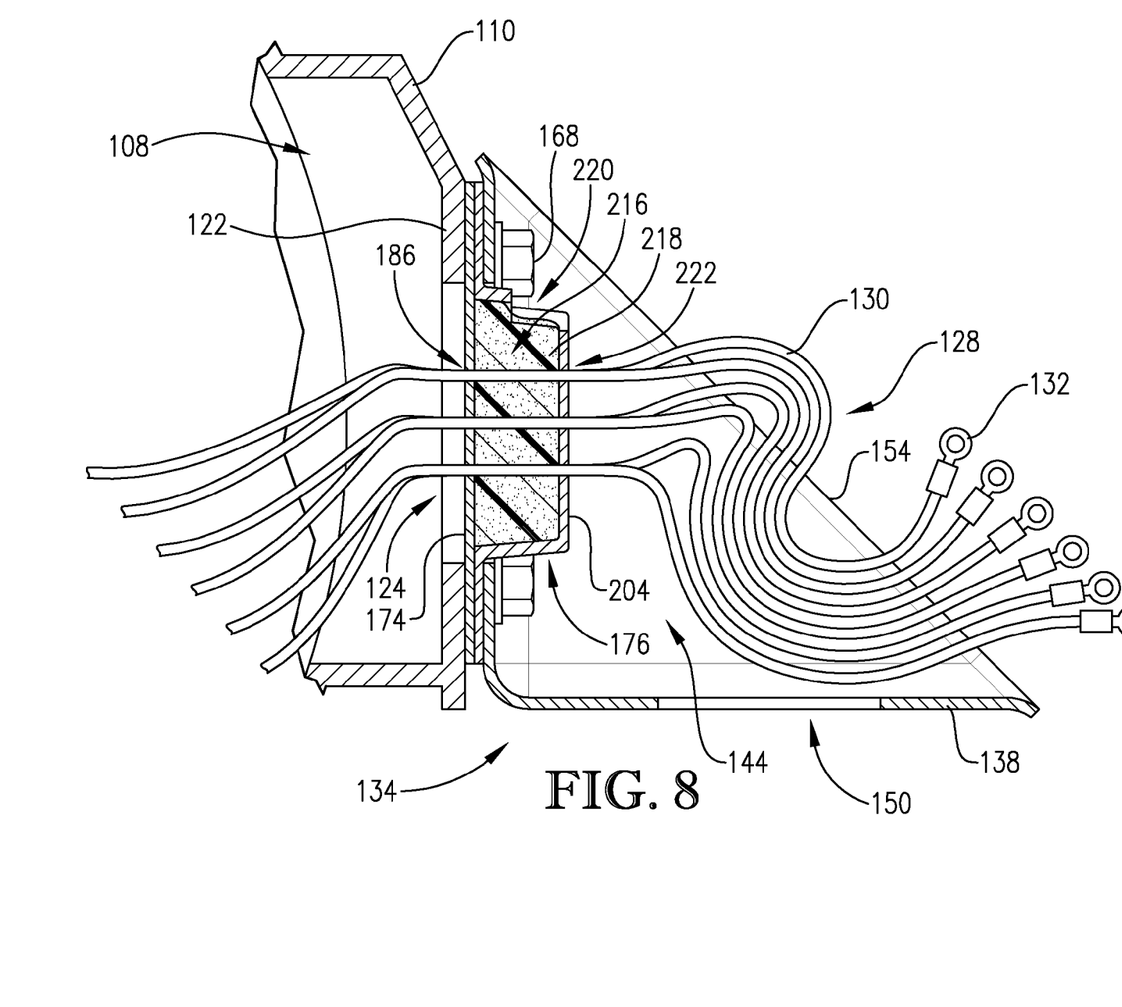
FIG. 8 is an enlarged, fragmentary cross-sectional view of a portion of the electric motor, particularly illustrating in detail the wiring passing through an opening in the motor case, the gasket covering the opening, and liquid sealant contained in the cavity of the gasket pocket.

Turning finally to the cross-sectional view of FIG. 8, the pathway of the wiring 128 is depicted extending from the inside of the motor chamber 108 outward to the interior 144 of the conduit box 134. It is specifically noted that the power-supply opening 124 in the motor case 110, the central wall portion 182 of the first gasket panel 174, the end wall 204 of the second gasket panel 176, and the power-supply opening 146 in the conduit box 134 are all horizontally aligned to facilitate such a pathway of the wiring 128. It is further noted that the end wall 204 of the second gasket panel 176 is spaced horizontally away from the central wall portion 182 of the first gasket panel 174 so that the pocket 202 projects at least partly into the interior 144 of the conduit box 134.

With continued reference to FIG. 8, the liquid sealant 218 is received within the cavity 216 of the pocket 202 so as to seal around the wiring passageway 186 of the first gasket panel 174. In this way, moisture that may enter the interior 144 of the conduit box 134 is prevented from seeping into the inside of the motor chamber 108 through the wiring passageway 186. Furthermore, the seal provided by the gasket 172 against the motor case 110 prevents moisture that may exist around the outside of the motor case 110 from seeping into the inside of the motor chamber 108 through the outer periphery of the power-supply opening 124 in the motor case 110. The sealing out of moisture from the inside of the motor chamber 108 prevents damage to the electrical elements of the motor 100 in moist or wet operating conditions.

In use, the motor case 110 is preferably positioned in a right-side-up orientation and supported by the feet 102 extending downwardly. Lead wiring 128 is connected to the proper components within the motor chamber 108 and the wiring 128 is passed out of the motor chamber 108 through the power-supply opening 124 in the side of the motor case 110. The gasket 172 is positioned against the motor case 110, with the back face 180 of the first gasket panel 174 disposed flushly against the flat face 122. The plurality of holes 190 are aligned with the corresponding bolt-receiving holes 126 with the central wall portion 182 covering the power-supply opening 124 in the motor case 110. The wiring 128 is passed through the wiring passageway 186 of the first gasket panel 174.

The second gasket panel 176 is positioned against the first gasket panel 174, with the back face 198 of the second gasket panel 176 disposed flushly against the front face 178 of the first gasket panel 174. The plurality of holes 200 are aligned with the corresponding plurality of holes 190 and the corresponding bolt-receiving holes 126, with the end wall 204 being horizontally spaced away from the central wall portion 182. The conduit box 134 is then positioned against the second gasket panel 176 such that the pocket 202 projects at least partially into the interior 144 of the conduit box 134. The plurality of holes 148 are aligned with the corresponding holes 200 and 190 in the second gasket panel 176 and first gasket panel 174, respectively, and with the bolt-receiving holes 126. The bolts 168 with lock washers 170 are inserted into the holes 126 and tightened to secure the conduit box 134 to the motor case 110, with the gasket 172 disposed therebetween. The gasket 172 seals around the power-supply opening 124 in the side of the motor case 110 to prevent moisture from entering the power-supply opening 124.

The wiring 128 is passed through the wiring passageway 222 of the second gasket panel 176 and is disposed within the interior 144 of the conduit box 134 for appropriate connection to power supply leads (not shown). Liquid sealant 218 is introduced to the cavity 216 of the pocket 202 through the filling hole 220 while the motor 100 remains positioned in a right-side-up orientation and supported by the feet 102 extending downwardly. As the sealant 214 solidifies to seal around the wiring 128 passing through the wiring passageway 186 of the first gasket panel 174, additional motor assembly process can be carried out, without any need to pivot the motor 100 into an alternate orientation. Maintaining the motor 100 in a stationary position during the sealing process serves to minimize the risks associated with pivoting a heavy piece of equipment and eliminates idle time previously spent waiting for the sealant to solidify.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor comprising:
   a rotor rotatable about an axis;
   a stator spaced radially from the rotor;
   a case presenting an internal motor chamber in which the stator and rotor are housed, with a power-supply opening defined in the case to provide wiring access to the motor chamber,
   said power-supply opening being located along a side of the case and facing at least a substantially horizontal direction;
   motor wiring extending through the power-supply opening and into the motor chamber; and
   a gasket fastened to the case in a covering relationship with the power-supply opening, said gasket including a first upright wall that spans the power-supply opening and includes a wiring passageway snugly receiving the motor wiring therethrough,
said gasket including a second upright wall at least partially spaced horizontally from the first upright wall to cooperatively define a pocket that receives the motor wiring extending through the wiring passageway,
said pocket defining a cavity configured to hold a liquid sealant.

2. The electric motor as claimed in claim 1,
said pocket presenting a filling hole,
said filling hole being in communication with the cavity and thereby permitting liquid sealant to be introduced therein.

3. The electric motor as claimed in claim 2,
said pocket presenting a top margin,
said filling hole being located along the top margin of the pocket.

4. The electric motor as claimed in claim 3,
said rotatable axis of the rotor being at least substantially horizontal.

5. The electric motor as claimed in claim 4,
said case including downwardly extending feet for supporting the motor in a right-side-up orientation, with the rotor axis being horizontal,
said pocket filling hole facing upwardly when the motor is in the right-side-up orientation.

6. The electric motor as claimed in claim 1; and
a conduit box overlying the power-supply opening and surmounting the gasket,
said conduit box providing a connection location outside the case for the motor wiring.

7. The electric motor as claimed in claim 6,
fasteners securing the conduit box to the side of the case and clamping a portion of the gasket between the case and the conduit box.

8. The electric motor as claimed in claim 7,
said fasteners comprising bolts that extend through generally aligned holes in the conduit box and in the gasket and into generally aligned threaded bolt-receiving holes in the case.

9. The electric motor as claimed in claim 6,
said conduit box including a generally centrally disposed pocket receiving hole defined in a gasket engaging side thereof,
said pocket receiving hole being shaped to generally correspond to the shape of the pocket such that the pocket of the gasket extends at least partially horizontally into the conduit box.

10. The electric motor as claimed in claim 1; and
a liquid sealant contained within the pocket of the gasket to provide a moisture barrier around the motor wiring to prevent moisture from entering the motor chamber.

11. The electric motor as claimed in claim 10,
said motor wiring including a plurality of wires,
said wiring passageway comprising a plurality of X-shaped holes, each snugly receiving a respective one of the wires therethrough.

12. The electric motor as claimed in claim 11,
said liquid sealant being sufficiently viscous so as to not pass through the X-shaped holes and thereby remain confined in the pocket.

13. The electric motor as claimed in claim 12,
said liquid sealant comprising a hot melt sealant.

14. The electric motor as claimed in claim 1,
said second upright wall being spaced entirely from the first upright wall,
said gasket including a generally horizontally extending interconnecting wall that interconnects the first and second upright walls.

15. The electric motor as claimed in claim 14,
said pocket presenting a filling hole that is in communication with the cavity and thereby permitting liquid sealant to be introduced therein,
said filling hole being defined primarily in an upper section of the interconnecting wall.

16. The electric motor as claimed in claim 14,
said second upright wall including a wiring passageway that snugly receives the motor wiring therethrough, such that the motor wiring extends through both the first and second walls.

17. The electric motor as claimed in claim 14,
said second upright wall being generally circular in shape and said interconnecting wall being generally cylindrical in shape.

18. The electric motor as claimed in claim 1,
said gasket including separate first and second panels, with the first and second upright walls being defined by the first and second panel, respectively.

19. The electric motor as claimed in claim 18,
said first panel being flat and including a central wall portion that spans the power-supply opening and a circumscribing flange portion,
said second panel including a flat outer flange portion and a central pocket-defining portion,
said pocket-defining portion including an end wall spaced laterally from the central wall portion of the first panel and an interconnecting wall that extends laterally between the end wall and central wall portion.

20. The electric motor as claimed in claim 19,
said case presenting a flat gasket-engaging surface circumscribing the power-supply opening,
said flange portions of the gasket being placed flushly against the gasket-engaging surface, with the flange portion of the first panel being interposed between the flange portion of the second panel and the gasket-engaging surface.

21. A gasket for covering a horizontally facing power-supply opening located on the side of an electric motor case, wherein wiring from the motor chamber extends through the power-supply opening, said gasket comprising:
a first upright wall that is configured to span the power-supply opening and includes a wiring passageway configured to snugly receive the motor wiring therethrough,
a second upright wall that is at least partially spaced horizontally from the first upright wall to cooperatively define a pocket for receiving the motor wiring,
said pocket defining a cavity configured to hold a liquid sealant.

22. The gasket as claimed in claim 21,
said pocket presenting a filling hole,
said filling hole being in communication with the cavity and thereby permitting liquid sealant to be introduced therein.

23. The gasket as claimed in claim 22,
said pocket presenting a top margin,
said filling hole being located along the top margin of the pocket.

24. The gasket as claimed in claim 21,
said wiring passageway comprising a plurality of X-shaped holes, each configured to snugly receive a respective motor wire therethrough.

25. The gasket as claimed in claim 21, said second upright wall being spaced entirely from the first upright wall, said gasket including a generally horizontally extending interconnecting wall that interconnects the first and second upright walls.

26. The gasket as claimed in claim 25, said pocket presenting a filling hole that is in communication with the cavity and thereby permitting liquid sealant to be introduced therein, said filling hole being defined primarily in an upper section of the interconnecting wall.

27. The gasket as claimed in claim 25, said second upright wall including a wiring passageway configured to snugly receive the motor wiring therethrough, such that the gasket permits motor wiring to extend through both the first and second walls.

28. The gasket as claimed in claim 25, said second upright wall being generally circular in shape and said interconnecting wall being generally cylindrical in shape.

29. The gasket as claimed in claim 21, said gasket including separate first and second panels, with the first and second upright walls being defined by the first and second panel, respectively.

30. The gasket as claimed in claim 29, said first panel being flat and including a central wall portion configured to span the power-supply opening and a circumscribing flange portion, said second panel including a flat outer flange portion and a central pocket-defining portion, said pocket-defining portion including an end wall spaced laterally from the central wall portion of the first panel and an interconnecting wall that extends laterally between the end wall and central wall portion.

31. The gasket as claimed in claim 30, said flange portions of the gasket being configured for flush placement against the motor case, with the flange portion of the first panel being interposed between the flange portion of the second panel and the case.

32. The gasket as claimed in claim 31, said flange portions being provided with a plurality of aligned fastener-receiving holes for facilitating securement of the gasket to the motor case.

* * * * *